US012318893B2

(12) United States Patent
Hingst et al.

(10) Patent No.: US 12,318,893 B2
(45) Date of Patent: Jun. 3, 2025

(54) BIT HOLDER FOR HOLDING AND SCREWING A SCREW WITH A SCREW HEAD IN A MOUNTING BASE

(71) Applicant: Kirchhoff Witte GmbH, Iserlohn (DE)

(72) Inventors: Alexander Hingst, Hagen-Fley (DE); Frank Rohlfs, Hagen (DE)

(73) Assignee: Kirchhoff Witte GmbH, Iserlohn (DE)

( * ) Notice: Subject to any disclaimer, the term of this patent is extended or adjusted under 35 U.S.C. 154(b) by 322 days.

(21) Appl. No.: 17/903,147

(22) Filed: Sep. 6, 2022

(65) Prior Publication Data

US 2023/0073611 A1 Mar. 9, 2023

(30) Foreign Application Priority Data

Sep. 3, 2021 (DE) ..................... 20 2021 104 749.6
Sep. 6, 2021 (DE) ..................... 10 2021 122 932.4

(51) Int. Cl.
*B25B 23/12* (2006.01)
*B25B 23/00* (2006.01)

(52) U.S. Cl.
CPC .......... *B25B 23/12* (2013.01); *B25B 23/0035* (2013.01)

(58) Field of Classification Search
CPC ..... B25B 23/12; B25B 23/0035; B25B 15/00; B25B 15/02
See application file for complete search history.

(56) References Cited

U.S. PATENT DOCUMENTS

| | | | | |
|---|---|---|---|---|
| 3,253,626 | A * | 5/1966 | Stillwagon, Jr. | B25B 23/12 81/177.85 |
| 7,204,177 | B1 * | 4/2007 | Garner | B25B 23/12 81/451 |
| 7,950,310 | B2 * | 5/2011 | Hung | B25B 23/12 81/125 |
| 9,314,852 | B2 * | 4/2016 | Santamarina | B25F 3/00 |
| 9,423,894 | B2 * | 8/2016 | Olsson | G06F 3/0338 |
| 10,022,847 | B2 * | 7/2018 | Tsai | B25B 15/004 |
| 10,322,479 | B2 * | 6/2019 | Kira | B25B 23/12 |
| 10,857,662 | B2 | 12/2020 | Rohlfs | |

FOREIGN PATENT DOCUMENTS

| | | | | |
|---|---|---|---|---|
| EP | 3009234 | A1 | 4/2016 | |
| FR | 3039448 | A1 * | 2/2017 | B25B 23/0035 |

OTHER PUBLICATIONS

English translation of FR 3039448 A1 accessed on patents.google.com (Year: 2024).*

* cited by examiner

*Primary Examiner* — David B. Thomas
(74) *Attorney, Agent, or Firm* — Polson Intellectual Property Law P.C.; Margaret Polson; Christopher Sylvain

(57) ABSTRACT

A bit holder for holding and driving a screw with a screw head into a fastening base, comprising a clamping region for connecting the bit holder to a driving tool and a bit receptacle for inserting a bit suitable for driving the screw. The bit holder has at least one magnet arranged eccentrically relative to the bit holder with one pole facing the screw head. The at least one magnet is held floating on a magnet holder in relation to a bit held in the bit receptacle, so that the pole face of the magnet can align according to the contour of the screw head in order to hold the screw on the bit holder in such a way that the bit engages torque-locked in a rotary driver contour of the screw head.

10 Claims, 3 Drawing Sheets

BIT HOLDER FOR HOLDING AND SCREWING A SCREW WITH A SCREW HEAD IN A MOUNTING BASE

CROSS REFERENCE APPLICATIONS

This application claims the priority to German application no. 20 2021 104 749.6 filed Sep. 3, 2021 and German application no. 20 2021 122 932.4 filed Sep. 6, 2021, which is hereby incorporated by reference for all purposes.

BACKGROUND

The disclosure relates to a bit holder for holding and driving a screw with a screw head into a fastening base, comprising a clamping region for connecting the bit holder to a driving tool and a bit receptacle for inserting a bit suitable for driving the screw.

In order to drive a screw into a fastening base by means of a rotary movement, a screw typically has a rotary driver contour on its screw head. This rotary driver contour is often a contour notched into the screw head, for example a cross contour or a torx contour.

In order to drive such a screw into a fastening base, bits corresponding to the rotary driver contour are available, which serve as an adapter between the rotary driver contour of the screw and a standardized bit holder that can be used for a variety of applications. The bit is inserted into a bit receptacle of the bit holder on one side. The bit holder has a clamping region for connecting the bit holder to a driving tool, such as a manual screwdriver or an electrically operated screwdriver, such as an impact wrench. It can be round or, preferably, angular, such as hexagonal.

In many cases, the bit receptacle of the bit holder is magnetic. This keeps the bit in the bit receptacle safe, simple and easy to replace. In addition, a screw can be held on the bit holder or on the bit by the magnetic force passed on via the bit. This allows the screw to be securely positioned on the mounting base without having to be held manually. This enables driving the screw using a screwdriver with one hand.

However, holding screws to the bit by magnetic force is limited to small and light screws. In particular, it is not possible to use screws with a length of >200 or 300 mm to hold securely on a bit holder. However, it is desirable to provide a bit holder with which longer and heavier screws can also be held securely. It is an aspect of the disclosure to provide such a bit holder.

The foregoing example of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above-described problems have been reduced or eliminated, while other embodiments are directed to other improvements.

According to the present disclosure, the above aspect is achieved by a generic bit holder as mentioned at the outset, the bit holder comprising at least one magnet which is arranged eccentrically in relation to the bit receptacle and has one pole pointing towards the screw head, the magnet being held on a magnet holder in a floating manner in relation to a bit held in the bit receptacle, so that the pole face of the at least one magnet can be aligned according to the contour of the screw head in order to hold the screw on the bit holder in such a way that the bit engages torque-locked in a rotary driver contour of the screw head.

The present bit hold has an additional magnet which is arranged eccentrically in relation to the bit or the bit receptacle and which adapts to the contour of the screw head. The screw is not only held on the bit holder by magnetic force in the area of its rotary driver contour, but also on the material surrounding the rotary driver contour. The screw is held on the bit holder by means of a corresponding arrangement of the magnet in such a way that the bit can engage torque-locked in the rotary driver contour of the screw head.

With the proposed bit holder, different screws, including larger ones, can be securely pre-positioned. In addition, high torques can be transmitted, with the proposed bit holder minimizing the risk of screw and bit separating from one another due to high torques.

The at least one magnet is held on a magnet holder and can be moved relative to the bit receptacle in the direction of the magnetizable screw head to be held. In this way, the pole face of the magnet can adapt to the contour of the screw head, even if it is curved, for example. For this reason, the pole face essentially points in the longitudinal direction of the bit holder.

If the screw head of the screw to be held is potentially curved, the magnet holder can be designed such that a pivoting movement of the magnet is made possible by its mechanical properties or its shape so that the pole face can align itself according to the contour of the screw head. The necessary freedom of movement of the magnet or its pole face is determined on the one hand by the minimum mobility required to bring the magnet to the contour of the screw head, and on the other hand limited by the fact that the screw is held on the bit holder due to the magnetic connection between the screw head and magnet in such a way that the bit contacts or engages torque-locked in the designated area in the screw head.

The at least one magnet, which is typically designed as a pot magnet, can be placed on the magnet holder. In order to securely bond the magnet to the magnet holder, it is preferable for the magnet to be inserted into the magnet holder. For this purpose, the magnet holder has a corresponding cutout into which the magnet engages or also penetrates, at least in sections. It is also possible for the magnet to be designed in the shape of a hat. The projection protruding at least in sections from the magnet rests against the side of the magnet holder pointing away from the screw head, so that when the connection between the screw head and the magnet is released, the form fit prevents the magnet from being pulled out of the magnet holder. To protect the magnet, it can also be covered with a plastic.

The magnet holder is mounted on the bit holder so that it rotates with the screw head. For this purpose, the bit holder can be connected to the magnet holder in a rotationally locked manner; however, this is not absolutely necessary since the magnet holder is held primarily on the screw head in any case with regard to its rotation.

Provision can be made for the magnet holder to point radially outwards from the longitudinal axis of the bit holder and for the mounting of the magnet to be deformable. The magnet holder provides the necessary deformability for the floating mounting of the magnet by its extension, starting from the longitudinal axis of the bit holder towards its free end pointing outwards. The magnet is held at the free end.

The advantage of the possible deformation of the magnet holder is that the bit holder can be used for a large number of different screw head contours.

Provision can be made for the deformation to take place elastically. The elasticity of the magnet holder can be adjusted via the choice of material. For example, elastomers can be used that can be easily and reproducibly set in terms of their elasticity. In addition, predetermined buckling points can be provided along the radial extent of the magnet holder, which deliberately weaken the material.

It can be advantageous if the magnet holder is formed as a perforated disc. The perforated disc typically encloses the bit receptacle or the bit; in any case, the bit receptacle or the bit reaches through the hole in the perforated disc. A plurality of magnets, for example three or more, can also be distributed along the circumference of the perforated disc. This not only ensures a higher holding force, but also comprehensive support that is independent of the positioning of the screw.

By providing the magnet holder as a perforated disc, the freedom of movement of the magnet holder can also be deliberately adjusted: To align the magnet with respect to the contour of the screw head, the radially outward-pointing edge of the perforated disc is pulled in the longitudinal direction of the bit holder opposite the inner edge pointing towards the hole. At the same time, the outer diameter of the perforated disc typically decreases. Since the material of the perforated disc is supported on either side along its circumference, this process is only possible to a certain extent, so that the perforated disc already restricts the freedom of movement of the magnet due to its shape. This process can also be designed to be elastic: a certain force is required to deform the perforated disc, which can be stored in the material of the perforated disc and can be used as a relaxation force to reset the perforated disc to its starting position. In addition, by supporting the outer edge in the circumferential direction, a magnet holder designed as a perforated disc is also particularly stable in the circumferential direction.

In order to improve the deformability of the perforated disc and thus the floating mounting of the at least one magnet, the perforated disc can be configured in segments. A segment then typically comprises at least one magnet. For segmentation, the perforated disc has predetermined buckling points along its circumference. The individual segments can move against one another through the predetermined buckling points, so that the pole face of the at least one magnet can adapt to the contour of the screw head.

The predetermined buckling points can be provided by material cutouts. In this way, at least one incision site in the radial direction can be provided, so that the perforated disc has a reduced material thickness at this point in the longitudinal direction of the bit holder. It can also be provided that the perforated disc is severed in sections in the radial direction, so that the perforated disc has a substantially uniform material thickness and webs are provided through the separation points, which connect the individual segments to one another. A combination of the aforementioned configurations of the predetermined buckling points is possible.

Typically, such a perforated disc, if elastomeric, is manufactured as part of an injection molding process. As a result, the required geometries can already be specified in a tool. However, it is also possible to use a sealing ring that is freely available on the market and to equip it with the properties by appropriate shaping (e.g. punching).

Provision is preferably made for the magnet holder to be held on the bit holder by a housing which at least partially encloses the magnet holder. The housing can be a plastic housing. The housing can enclose the magnet holder from the outside and limit the freedom of movement of the magnet holder or the at least one magnet by a corresponding shaping of the housing inner contour. For this purpose, the housing can have stops against which the magnet holder or the magnet can positively and/or frictionally strike to prevent the magnet holder and/or the magnet from being detached from the bit holder when separating the screw and bit holder.

Provision can be made for the housing to have a curved inner contour at least in sections, with the curvature at least in sections being greater than the trajectory of the free end of the magnet holder when this is deformed to adapt to the contour of the screw head. The magnet holder is typically designed in such a way that it can be bent between a section pointing radially inwards and the free end in order to provide the floating mounting of the magnet. This can be done by a rigid connection between the bit receptacle or the bit and the magnet holder on the one hand and the loose mounting of the end of the magnet holder pointing radially outward. In particular, if the magnet holder is designed as a perforated disc, it is not necessary to connect the perforated disc with its radially inward-pointing edge to the bit or the bit holder; a certain contact surface on the bit or bit holder is sufficient for dissipating the bending moment introduced into the magnet holder by the deformation of the magnet holder as a result of the adaptation to the contour of the screw head and, if necessary, at least one predetermined buckling point supporting the desired curvature. If the magnet holder is curved by adapting it to the contour of the screw head, the magnet holder between the bit or bit receptacle on the one hand and the housing inner contour on the other hand is prestressed by compressive stress acting on the magnet holder as the curvature increases. If the screw head is loosened, the magnet holder returns to its original position due to the relaxation of the material.

In addition, the freedom of movement of the magnet holder is limited in the case of a certain curvature, in that the magnet holder is clamped between the housing inner contour and the bit or bit receptacle. In order to counteract non-detachability due to self-locking between the magnet holder and the housing, the outer edge of the magnet holder can have cutouts along its circumference, so that the contact surface is reduced.

Provision can be made for the housing to at least partially enclose the magnet holder relative to the mounting base and to be mounted such that it can rotate about the longitudinal axis of the bit holder. In this way, only the housing directly contacts the mounting base when the screw is driven into the mounting base. Due to the rotatable mounting, the mounting base does not become damaged by the rotating movement of the bit holder; rather, the housing is braked by the contact between the housing and the fastening base to a standstill, so that the housing rotates relative to the bit holder. In addition, it can be provided that the housing does not protrude beyond the plate of the screw head pointing towards the mounting base in the direction of the mounting base; the part pointing furthest to the mounting base should be the section of the screw head pointing to the mounting base (an exception to this may be the bit, depending on how far it engages in the rotary driver contour of the screw).

In order to set up the magnet holder with the at least one magnet for adapting to a screw head contour, it is provided that the magnet holder, possibly guided in a housing, can be moved in relation to the longitudinal extent of the bit holder in a set-up state. In this way, it can be set how far a bit held in the bit receptacle protrudes the surfaces of the magnet/magnet holder facing the screw head and thus engages in the rotary driver contour of the screw. To move the magnet holder along the longitudinal direction of the bit holder, the housing can have an internal thread pointing towards the bit holder, whereas the bit holder has an external thread, so that rotating the magnet holder in the housing moves it along the thread. For use, the magnet holder is fixed in a use state. A fixing housing can be provided for fixing, which is rotated against the magnet holder housing in the manner of a lock nut, also having an internal thread and screwed onto the external thread of the bit holder, so that the two housings jam against one another.

Due to the stable holding of the screw by means of the proposed bit holder, it is also possible to provide sections with a reduced cross-sectional area between the bit receptacle and the clamping region of the bit holder. A plurality of such sections with a reduced cross-sectional area are preferably arranged one after the other, each interposed by a section with an enlarged cross-sectional area. The reduced cross-sectional area provides a spring area which, particularly when using impact wrenches as a driving tool, reduces the impact load on the screw so that it is inserted more gently into the fastening base. This avoids damaging the screw.

The bit holder also holds a particularly long screw, which is particularly preferably driven into a fastening base with an impact wrench, so securely that a large distance between the handle of an impact wrench and the screw head is acceptable, so that space was created in this way to provide the sections of smaller cross-sectional area described above.

In addition to the exemplary aspects and embodiments described above, further aspects and embodiments will become apparent by reference to the accompanying drawings forming a part of this specification wherein like reference characters designate corresponding parts in the several views.

Before explaining example embodiments, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

Figure 1:
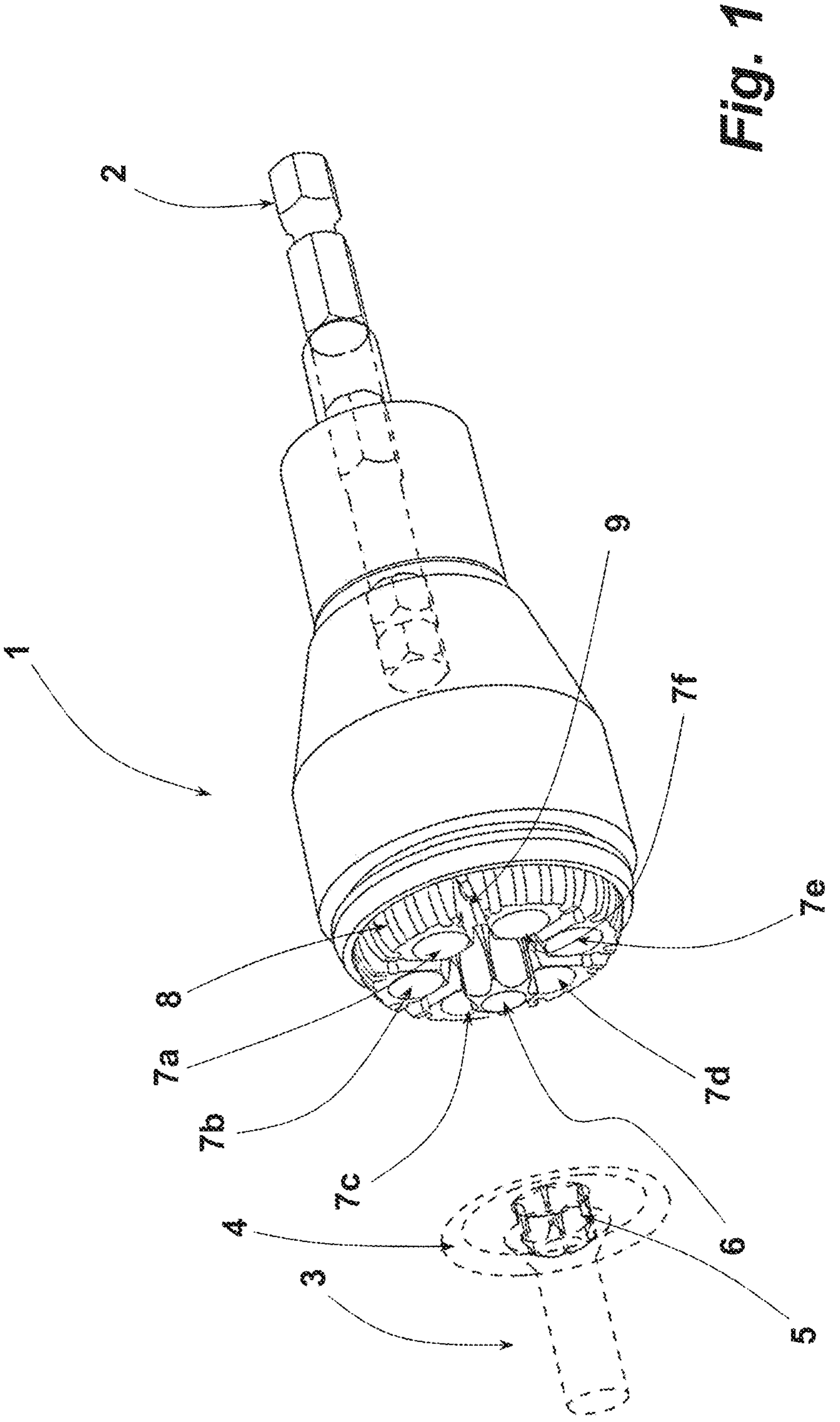
FIG. 1 is a perspective view of a bit holder.

FIG. 1 shows a bit holder 1. The bit holder 1 has a clamping region 2, with which the bit holder 1 can be clamped into a driving tool (not shown in detail). In this exemplary embodiment, the clamping region 2 is a hexagonal section. The bit holder 1 is used to drive a screw 3 shown in dashed lines in this figure, having a screw head 4. The screw 3 is to be driven into a fastening base (not shown in detail) by turning the same. For this purpose, the screw 3 has a rotary driver contour 5. A bit 6, which is complementary to engage in the rotary driver contour 5 is inserted into a bit receptacle (not visible in FIG. 1) of the bit holder 1.

The screw 3 has an overall length of about 300 mm (not shown here in full) and, because of its length, is very heavy. Overall, due to the long lever arm, this causes a high tilting moment on the screw head 4 when the screw 3 is to be held horizontally by the bit holder 1. To hold the screw 3 on the bit holder 1, the bit holder 1 has magnets 7*a*-7*f*, which are held in a magnet holder 8, which is accommodated in a housing hidden in FIG. 1 and described below, along the circumference of the magnet holder 8. The pole faces of the magnets 7*a*-7*f* point towards the screw head 4 of the screw 3 and are arranged eccentrically in relation to the bit 6 (and thus also in relation to the longitudinal extent of the bit holder 1).

The magnet holder 8 is designed as a perforated disc and has predetermined buckling points 9 (only a single predetermined buckling point is shown in FIG. 1 for the sake of clarity). The predetermined buckling points 9 are incisions in the magnet holder 8 in the radial direction, so that a single magnet holding segment is provided for each magnet 7*a*-7*f*. As a result, the magnets 7*a*-7*f* are mounted in a floating manner.

Figure 2:
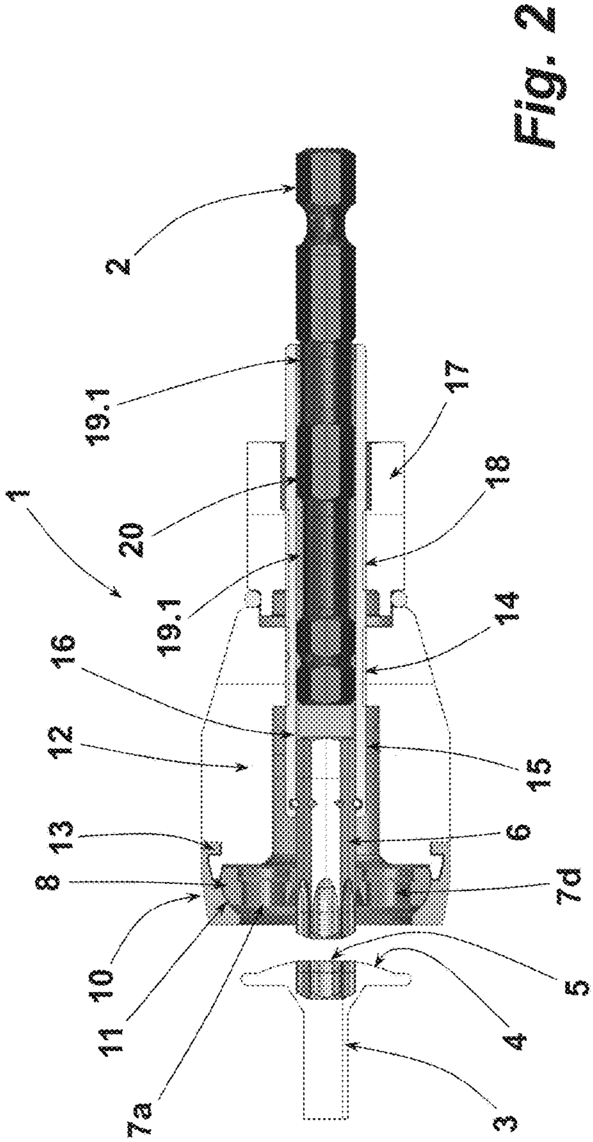
FIG. 2 is a side sectional view of the bit holder with the magnet holder in a first position.
Figure 3:
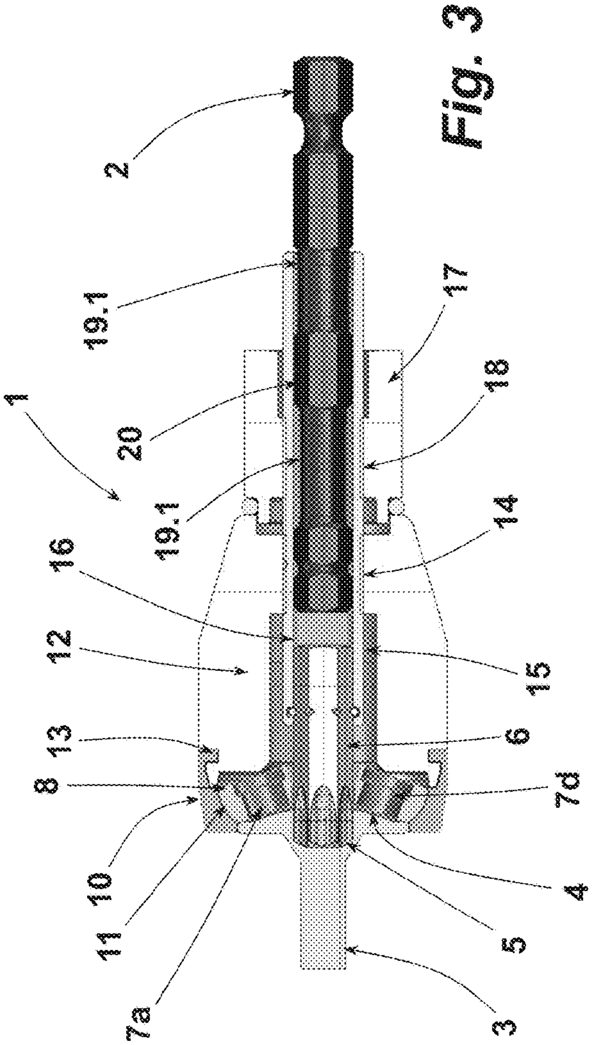
FIG. 3 is a side sectional view of the bit holder shown in FIG. 2, with the magnet holder in a second position holding a screw head.

FIGS. 2 and 3 show the same bit holder 1 as in FIG. 1 in a cross-sectional side view. The reference symbols are therefore used identically. FIG. 2 shows the bit holder 1 in an initial position, FIG. 3 while holding the screw 3 or the screw head 4: In FIG. 2, the screw head 4 of the screw 3 and the bit holder 1 are still separate. The bit 6 is surrounded by the magnets 7*a*, 7*d*, which are arranged in the magnet holder 8 designed as a perforated disc. If the screw 3—as shown in FIG. 3—is brought up to the bit holder 1, the magnet holder 8 deforms as a result of the efforts of the magnets 7*a*, 7*d* to contact the screw head 4, but keeps the magnets 7*a*, 7*d* on the bit holder 1. The deformation of the magnet holder 8 is made possible by the predetermined buckling points 9, 9*a*-9*f* of the magnet holder 8 shown in FIGS. 1 and 5. The magnets 7*a*, 7*d* can thus adapt to the curvature of the screw head 4 in order to produce a magnetic connection via the contact.

In this way, the screw 3 is not only held on the bit holder 1, but it is also ensured that the bit 6 engages in the rotary driver contour 5 of the screw 3. In addition, the tilting moment acting on the connection between the screw head and the bit holder is supported by the form-fitting engagement of the bit 6 in the rotary driver contour 5.

The magnet holder 8 is held in a housing 10. The housing 10 has a curved inner contour 11 on the inside. The magnet holder 8 also has a curvature on its outside which corresponds in sections to the curvature of the inner contour 11 of the housing 10. In this way, the magnet holder 8 is guided in the housing 10 or along its inner contour 11.

The curvature is such that, as can be seen in FIG. 3, further deformation of the magnet holder 8 in the direction of the screw head 4 is prevented in the state shown here, since the outer diameter of the magnet holder 8 abuts the inner contour 11 of the housing 10. The curvature of the inner contour 11 of the housing 10 is thus greater than the trajectory of the free end of the magnet holder 8 when it deforms to adapt to the contour of the screw head 4.

The housing 10 is positively connected to a connector 12 via a circumferential and rotationally symmetrical undercut 13. It is therefore rotatably mounted relative to the same. The connector 12 has an internal thread 14 which engages in an external thread 15 of the bit receptacle 16. If the connector 12 is rotated in relation to the bit receptacle 16, this is displaced together with the housing 10 of the magnet holder 8 along the longitudinal axis of the bit holder 1. In this way, it is possible to set how far the bit 6 is positioned in relation to the magnets 7*a*, 7*d* in the direction of the screw head 4 protrudes. This state is the set-up state. In order to produce a usage state, a counter element 17, likewise with an internal thread 18 and screwed onto the external thread 15 of the bit receptacle 16, is rotated against the connector 12.

Sections with a reduced cross-sectional area 19, 19.1 are arranged between the bit 6 and the clamping section 2, separated from a section with a larger cross-sectional area 20. The sections with a smaller cross-sectional area 19, 19.1 are twisted when using an impact wrench and thus cushion the impact against the screw 3. Optimally, the section with a smaller cross-sectional area 19 that is arranged closer to the clamping section 2 has a larger cross-sectional area than the section with a smaller cross-sectional area 19.1 that is further away from the clamping section 2.

Figure 5:
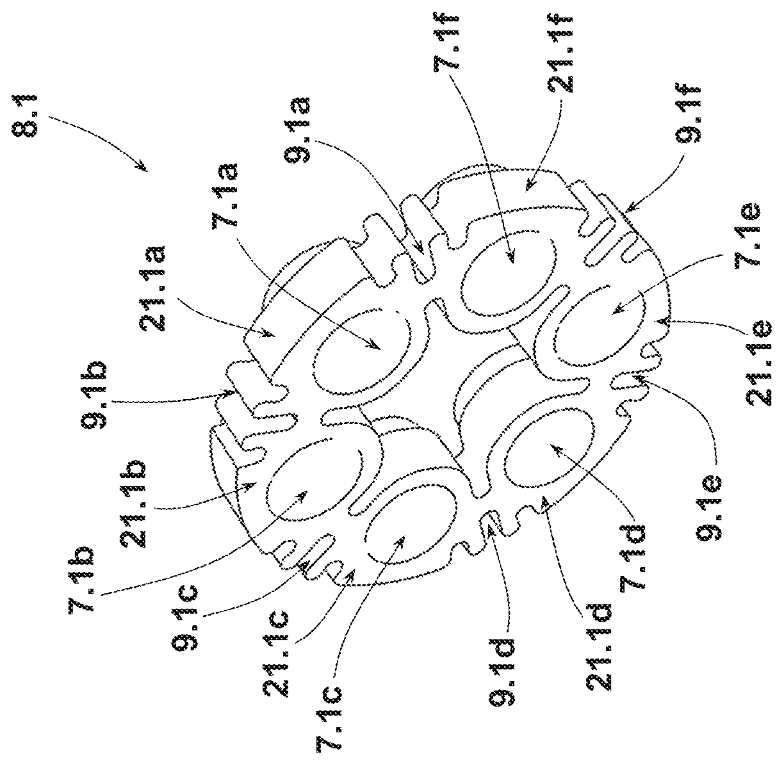
FIG. 5 is a perspective view of a second embodiment of a magnet holder.
Figure 4:
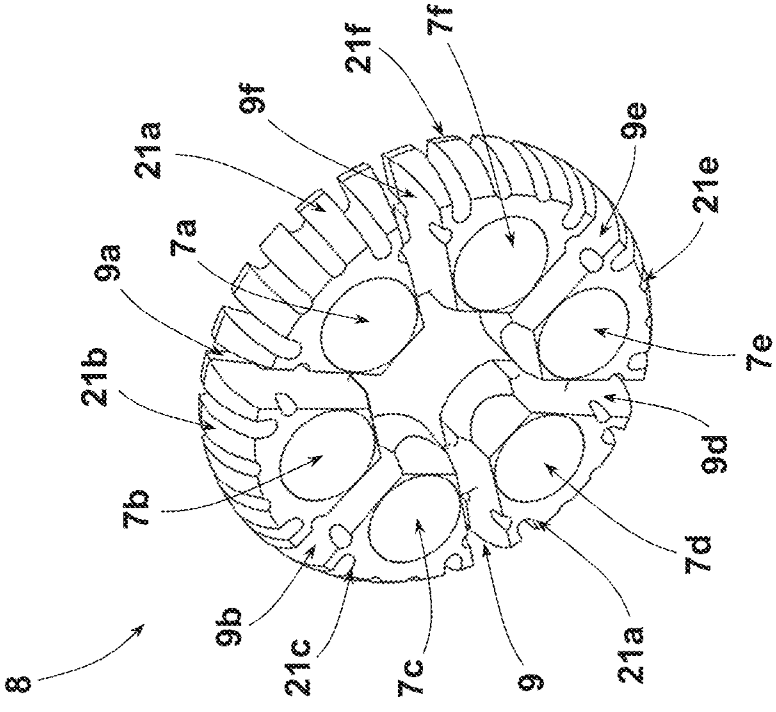
FIG. 4 is a perspective view of a first embodiment of a magnet holder.

FIGS. 4 and 5 show configurations of the magnet holder 8, 8.1. The magnet holder 8 shown in FIG. 4 by itself is also shown in the previous figures. Depicted are the magnets 7*a*-7*f* used in the magnet holder 8. These are glued into the magnet holder 8. A single segment 21*a*-21*f* is provided for each magnet 7*a*-7*f* by predetermined buckling points 9*a*-9*f* pointing in the radial direction both in the direction of material thickness and transversely thereto. Tilting of the individual segments 21*a*-21*f* is made possible by the webs of lesser strength connecting the segments 21*a*-21*f*, so that the magnet holder 8 together with its magnets 7*a*-7*f* can adapt to the contour of the screw head.

An alternative embodiment of the magnet holder 8 is shown in FIG. 5 (identified with reference number 8.1). This has a smaller thickness and is stamped out of a sealing disc. This magnet holder 8.1 also has six magnets 7.1*a*-7.1*f*, inserted into individual segments 21.1*a*-21.1*f*, each separated by predetermined buckling points 9.1*a*-9.1*f* provided in the direction of the axis of rotation of the magnet holder 8 or bit holder 1. Deformation of the magnet holder 8 is equally possible in this embodiment.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art. The above definitions are provided to clarify their specific use in the context of the invention.

LIST OF REFERENCE NUMERALS

1 bit holder
2 clamping region
3 screw
4 screw head
5 rotary driver contour
6 bit
7*a*-7*f*, 7.1*a*-7.1*f* magnet
8, 8.1 magnet holder
9, 9*a*-9*f*, 9.1*a*-predetermined buckling point
9.1*f*
10 housing
11 housing inner contour
12 connector
13 undercut
14 connector internal thread
15 bit receptacle external thread
16 bit receptacle
17 counter element
18 counter element internal thread
19, 19.1 smaller cross-sectional area section
20 larger cross-sectional area section
21*a*-21*f*. 21.1*a*-21.1*f* segment

We claim:

1. A bit holder for holding and driving a screw with a screw head into a fastening base, comprising:
- a clamping region for connecting the bit holder to a driving tool and a bit receptacle for inserting a bit fitting a screw,
- the bit holder having at least one magnet eccentrically arranged relative to the bit holder with one pole facing a screw head,
- the at least one magnet being held floating on a magnet holder in relation to a bit held in the bit receptacle, with the magnet holder configured to enable a pivoting movement of the at least one magnet, such that a pole face of the at least one magnet can align according to the contour of a screw head in order to hold a screw on the bit holder such that the bit is torque-locked in a rotary driver contour of a screw head.

2. The bit holder of claim 1, wherein the magnet holder points radially outwards from a longitudinal axis of the bit holder and is elastically deformable for the floating mounting of the magnet.

3. The bit holder of claim 1, wherein the magnet holder is formed as a deformable perforated disc on which several magnets are circumferentially distributed-.

4. The bit holder of claim 1, wherein the magnet holder has at least one predetermined buckling point for providing the floating mounting of the magnet along its circumference.

5. The bit holder of claim 1, wherein the magnet holder is made of an elastomer.

6. The bit holder of claim 1, wherein the magnet holder is held on the bit holder by a housing enclosing the magnet holder at least in sections.

7. The bit holder of claim 6, wherein at least a portion of the housing having a curved inner contour with a curvature being greater than a trajectory of the free end of the magnet holder at least in sections when the magnet holder is deformed to fit the contour of a screw head.

8. The bit holder of claim 6, wherein the housing is rotatably mounted around a longitudinal axis of the bit holder relative to the bit receptacle.

9. The bit holder of claim 1, wherein the magnet holder can be moved relative to the bit in a set-up state in a longitudinal direction of the bit holder and is fixed in the longitudinal direction when it is in use.

10. The bit holder of claim 1, wherein there is at least one section with a reduced cross-sectional area between the clamping region and the bit receptacle.

* * * * *